July 1, 1952  L. McLEAN  2,601,923
CLASSIFIER
Filed May 29, 1946
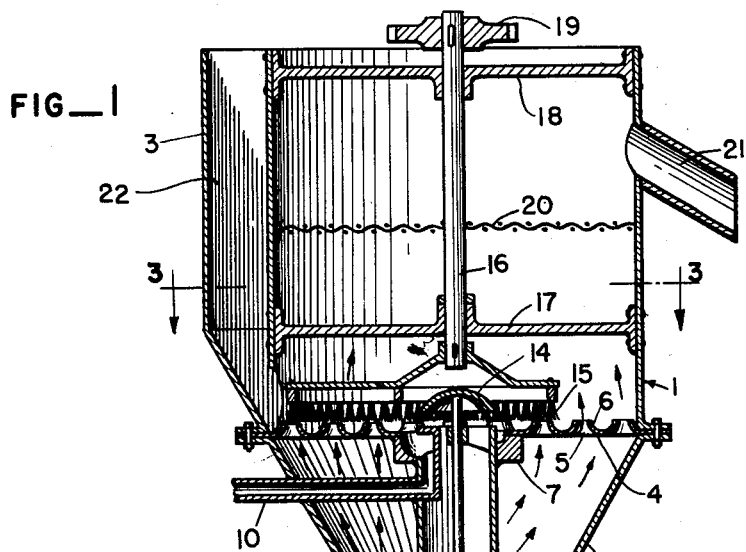
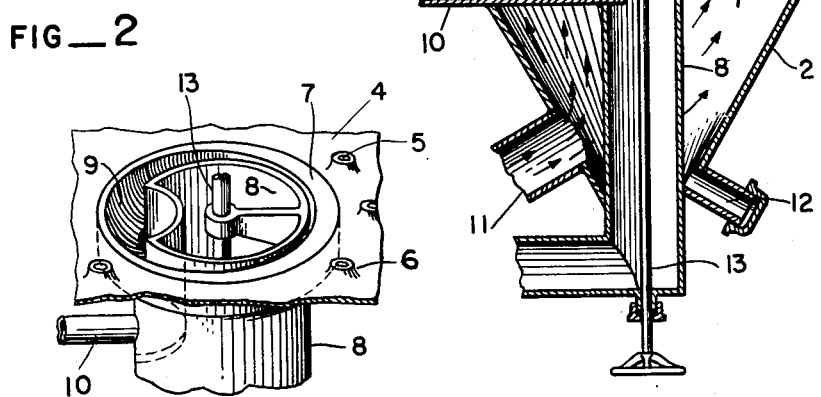
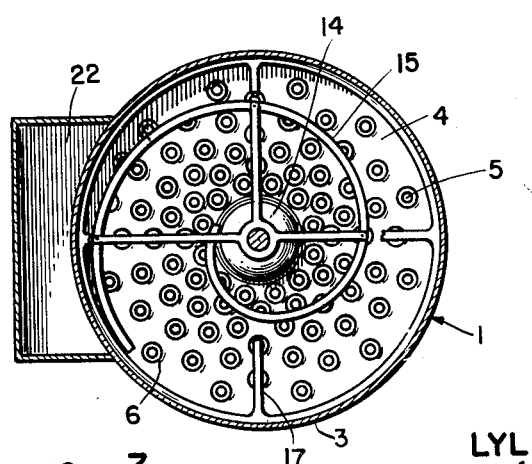
INVENTOR.
LYLE McLEAN
BY Paul Bliven Patented July 1, 1952

2,601,923

UNITED STATES PATENT OFFICE 2,601,923

CLASSIFIER

Lyle McLean, Los Angeles, Calif.

Application May 29, 1946, Serial No. 673,124

2 Claims. (Cl. 209—203)

The present invention relates to classifiers and, more particularly, to processes and machines for separating, concentrating, and amalgamating.

In the prior art, separation, concentration, and amalgamation have been considered to be more or less separate steps and to require separate apparatus. Furthermore, the prior art has found it difficult to obtain thorough mixing of mercury and the concentrate, and a continuous separation, or bleeding, of the resulting amalgam from the free mercury.

Having in mind these defects of the prior art, it is an object of the present invention to devise a process and a machine for carrying out such a process as will concentrate ore at the same time that the ore values are amalgamated.

A further object of the present invention is the devising of a process and machine for removing from the mercury the amalgam as it is formed.

Another object of the present invention is the provision of mediums of various densities that will effect a separation of materials of various densities when such are presented to such mediums.

Another object of the present invention is the provision of means for and the induction of the raw material, the gangue and the values into a treating vessel at a place close to the bottom of a stratified mass of the material.

Another object is the devising of a dry separation and concentration process using air or gas for actuating the treated materials.

Another object is the devising of a machine in which the above process may be carried out.

Having in mind the limitations of the prior art and these objects, applicant has devised a process and a machine for practicing such process, which machine comprises a vessel divided by a foraminous wall, or membrane, into an air chamber below the membrane and an ore suspension vessel above the membrane. The membrane is constructed and operated to carry a pool of mercury. There is a bleeder opening from the pool at its lowest depth so that the amalgam may be continually removed as it collects in the lowest part of the pool. Agitation of the ore above the mercury is had by passing air from the air chamber up through the foraminous membrane, and up through the ore suspension. This air agitation continually brings new particles of ore and values into contact with the mercury and stratifies the ore suspension. The ore suspension may be bled at various levels.

A machine built in accordance with the above brief description is described in detail hereinafter, and is shown in the accompanying drawings, in which:

Fig. 1 is a view of my machine in sectional elevation;

Fig. 2 is a detailed perspective view of a part of the device shown in Fig. 1;

Fig. 3 is a view on the line 3—3 of Fig. 1.

In Fig. 1 there is shown a classifier in sectional elevation, with the section on a diameter and the axis of the machine. Most of the parts are contained in the receptacle 1 that is divided into a conical air supply chamber 2, which has placed above it a cylindrical material suspension vessel 3. The air chamber and the suspension vessel are separated by means of a foraminous wall 4, or membrane. The edges of the chamber and vessel may be flanged and the membrane clamped between the adjacent flanges. Each of the openings 5 in the membrane is surrounded by an upstruck wall 6. Centrally of the membrane is an opening which has secured therearound and to the lower side of the membrane, a bleeder block 7. The bleeder block 7 has an opening centrally thereof and in this opening is an overflow or drain pipe 8. The top of the drain pipe 8 extends upwardly through the opening of the bleeder block and has its inlet end flush, or slightly above, the upper ends of the upstruck walls 6 of the openings 5. A trough 9 is formed in the bleeder block around the centrally located opening and is between the bleeder block 7 and the drain pipe 8. This trough is deeper on one side than on the other, and from the deepest part of the trough there extends a bleeder pipe 10 for removing material from the bottom of the trough 9. This bleeder pipe 10 is placed inside of the drain pipe, extends downwardly for a distance inside of the drain pipe, and then is carried to the outside of the drain pipe and the air chamber. The bleeder pipe may have placed in its outer portion a suitable valve for controlling the flow of the material in the bleeder pipe.

In the normal operation of the device, mercury is placed on the foraminous member 4, and fills the pockets between the upstanding walls 6 to form a mercury pool, and fills the bleeder pipe 10. Mercury is removed from the device by proper control of a valve in the bleeder pipe. Air is admitted to the air chamber through an air opening 11 placed in the lower portion of the air chamber and in the side thereof, and air is delivered into the air chamber under pressure through this opening. Opposite from the air opening is a dust-out opening 12 through which any accumulation of dust or foreign material may be removed at any time from the air chamber. The lower end of the drain pipe 8 has connected to it a side branch which may have associated therewith suitable valves. Extending upwardly through the drain pipe is a cap control rod 13 that has secured to its lower end an adjusting handle, and to its upper end a cap, or guard, 14. This cap, or guard, is formed as a segment of a cylindrical shell of a diameter which will allow it to cover the upper opening of the drain pipe 8. This cap may be adjusted to a proper spacing above the opening of the drain pipe by manipulation of the control rod 13.

Placed in the material suspension vessel 3 is a brush 15, formed in the shape of one or more flat helices. The helix shown is supported in the vessel by means of suitable bracing connected to a drive shaft 16, and bearinged in suitable struts 17, 18. The upper end of the drive shaft has secured thereto a pulley, or gear, 19 for rotational drive of the shaft 16. About midway of the vessel, and transversely thereof, is an anti-surge screen 20. Near the upper edge of the vessel is an overflow pipe 21 for the discharge of gangue from the device. Secured to the outside of the vessel is a feeding chute, or hopper, 22. This hopper opens to the interior of the vessel at a place just above the foraminous membrane 4.

In the operation of the present device, air in other gas, under pressure, is supplied to the air chamber 2, through the air inlet opening 11. The volume and pressure under which this air is delivered is sufficient to agitate and carry in suspension discrete solid material such as ground ore, seeds, or other aggregates supplied to the device through the chute 22 and its opening communicating with the interior of the material suspension vessel 3.

When material is being supplied to the device, the brushes 15 are rotated by the application of power to the gear 19 and the shaft 16. The drive shaft is slowly rotated in a counter-clockwise direction, as shown in Fig. 3. This rotation will cause the brushes to sweep the mercury and the foraminous plate 4, and to progress material centripetally from the periphery of the foraminous plate to the center, thence, in under the cap 14, and down the inlet of the overflow, or drain, pipe 8. The foraminous plate 4 may be operated without the upstruck walls 6, that is, the openings to the plate may be plain openings and the plate perfectly smooth and flat except for these openings. In the operation of the device with the upstruck openings, mercury is usually placed on the plate to a depth that brings the free surface of the mercury just below the top edge of the walls 6 of the opening 5 in the foraminous plate. The top surface of the liquid mercury forming a liquid-gas interface with the air in contact with such surface, and as shown such interface is of considerable extent. Under these conditions, material will collect on the mercury and be swept to the drain pipe 8. The purpose of the mercury is two-fold: that of reducing the friction on the plate and also, in the case of some ores, of amalgamating certain portions of the ore with the mercury. If certain portions of the ore, or values thereof, are amalgamated with the mercury, the mercury may be continuously bled from the plate by means of the bleeder pipe 10. New mercury may be supplied to this plate through the chute, or hopper, 22. Air flowing upwardly through the foraminous wall is prevented from channeling unduly through the suspension by one or more anti-surge screens 20, which serve to break up and redistribute the air as it flows upwardly through the suspension.

In the operation of the present device, it will be found that finely ground ore when fed to the device through the chute will stratify in the suspension vessel in discontinuous phase and that this stratified material may be removed from the vessel at one or more levels, such as shown in the present device, where the revolving brush 15 removes a portion of the suspension from the lower level, and the overflow pipe 21 removes a portion from the upper level. More overflow pipes, such as 21, may be provided, and helical sweeps, such as 15, or similar sweeps, may be provided at different levels for removing the material from the device at different levels. In the device illustrated in the present drawing, as the material is bled off or removed from the top stratum through the overflow pipe 21, the material thereunder will be carried upwardly and it, too, will be removed in the course of time.

Having thus described my invention, I claim:

1. A concentrator, comprising: a receptacle, a horizontal foraminous wall separating said receptacle into an air supply chamber below said wall and a material suspension vessel above said wall whereby air supplied to said chamber will pass upwardly thru said wall and then said vessel, a mercury pool on said wall, a bleeder pipe for said pool for removing mercury therefrom, a centrally located drain pipe having an inlet above said mercury pool, a cap over and spaced from said drain pipe inlet, a centripetally acting brush for sweeping the surface of said pool to feed material to said drain pipe inlet, and means for feeding material to said vessel at a position near the surface of said pool.

2. A concentrator, comprising: a receptacle, a horizontal foraminous wall separating said receptacle into an air supply chamber below said wall and a material suspension vessel above said wall whereby air supplied to said chamber will pass upwardly thru said wall and then said vessel, to agitate material in and to pass a portion of it upwardly thru said vessel, a mercury pool on said wall, means for sweeping the surface of said pool, discharge means for the sweepings from the surface of said pool, and means located near the bottom of said vessel for delivering material thereinto.

LYLE McLEAN.

REFERENCES CITED

The following references are of record in the file of this patent:

UNITED STATES PATENTS

| Number | Name | Date |
|---|---|---|
| 15,619 | Stetson | Aug. 26, 1856 |
| 293,936 | Becker | Feb. 19, 1884 |
| 456,852 | Rodermond | July 28, 1891 |
| 669,928 | Hubbard | Mar. 12, 1901 |
| 841,990 | Lightner | Jan. 22, 1907 |
| 896,169 | Stevens | Aug. 18, 1908 |
| 1,024,962 | Zyburn | Apr. 30, 1912 |
| 1,272,125 | Schmidt | July 9, 1918 |
| 1,695,369 | Davis | Dec. 18, 1928 |

FOREIGN PATENTS

| Number | Country | Date |
|---|---|---|
| 344,804 | Great Britain | Mar. 2, 1931 |
| 293,936 | Great Britain | Feb. 19, 1884 |
| 4,488 | Great Britain | Jan. 21, 1893 |